Aug. 10, 1954 C. S. ASH 2,686,063
AUXILIARY STEERING ARRANGEMENT FOR VEHICLES
Filed May 18, 1950 7 Sheets-Sheet 2
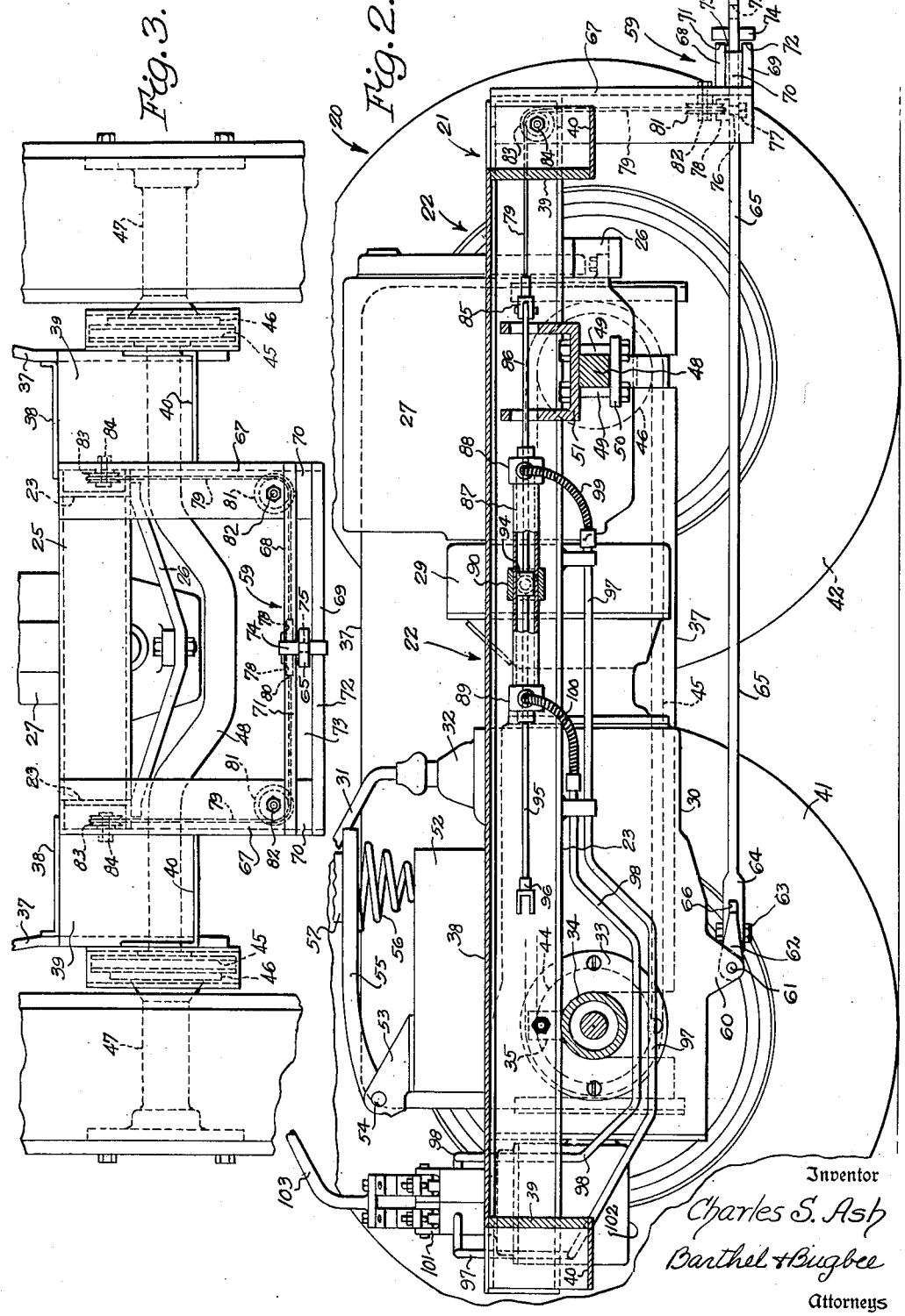
Inventor
Charles S. Ash
Barthel & Bugbee
Attorneys

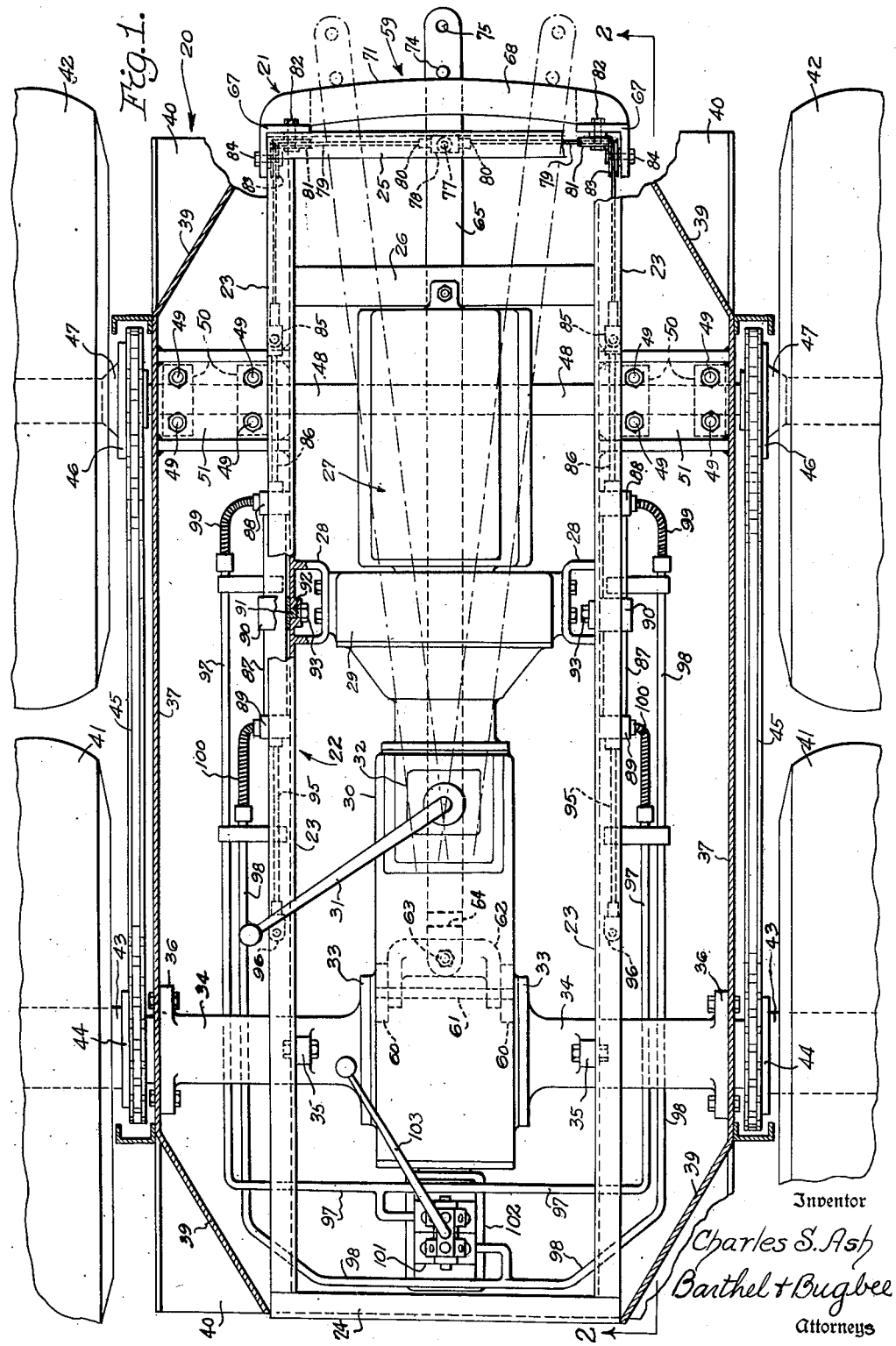

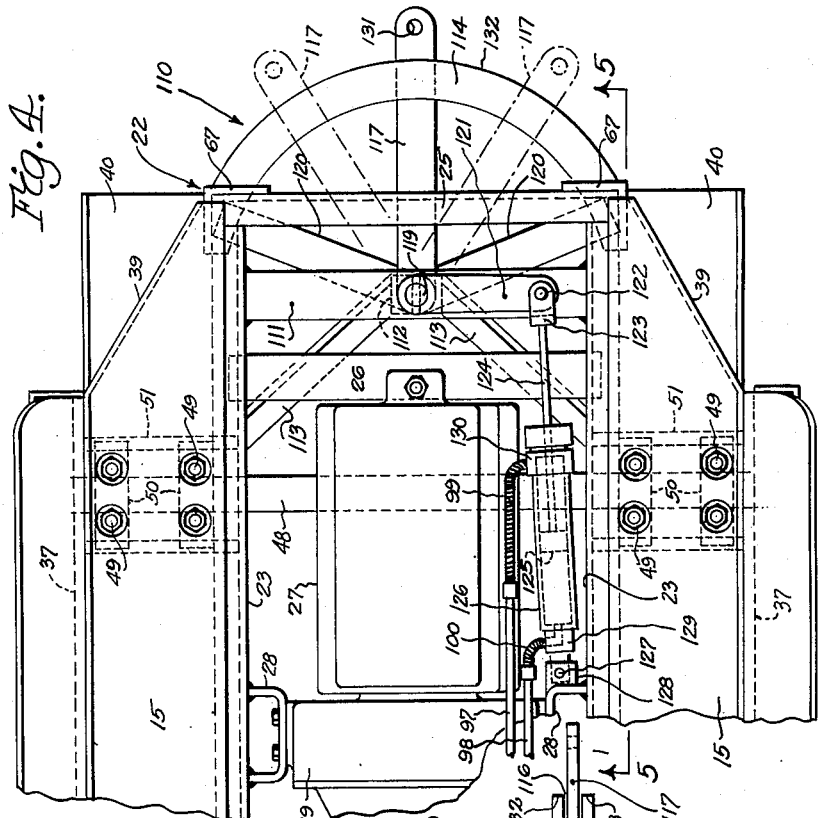

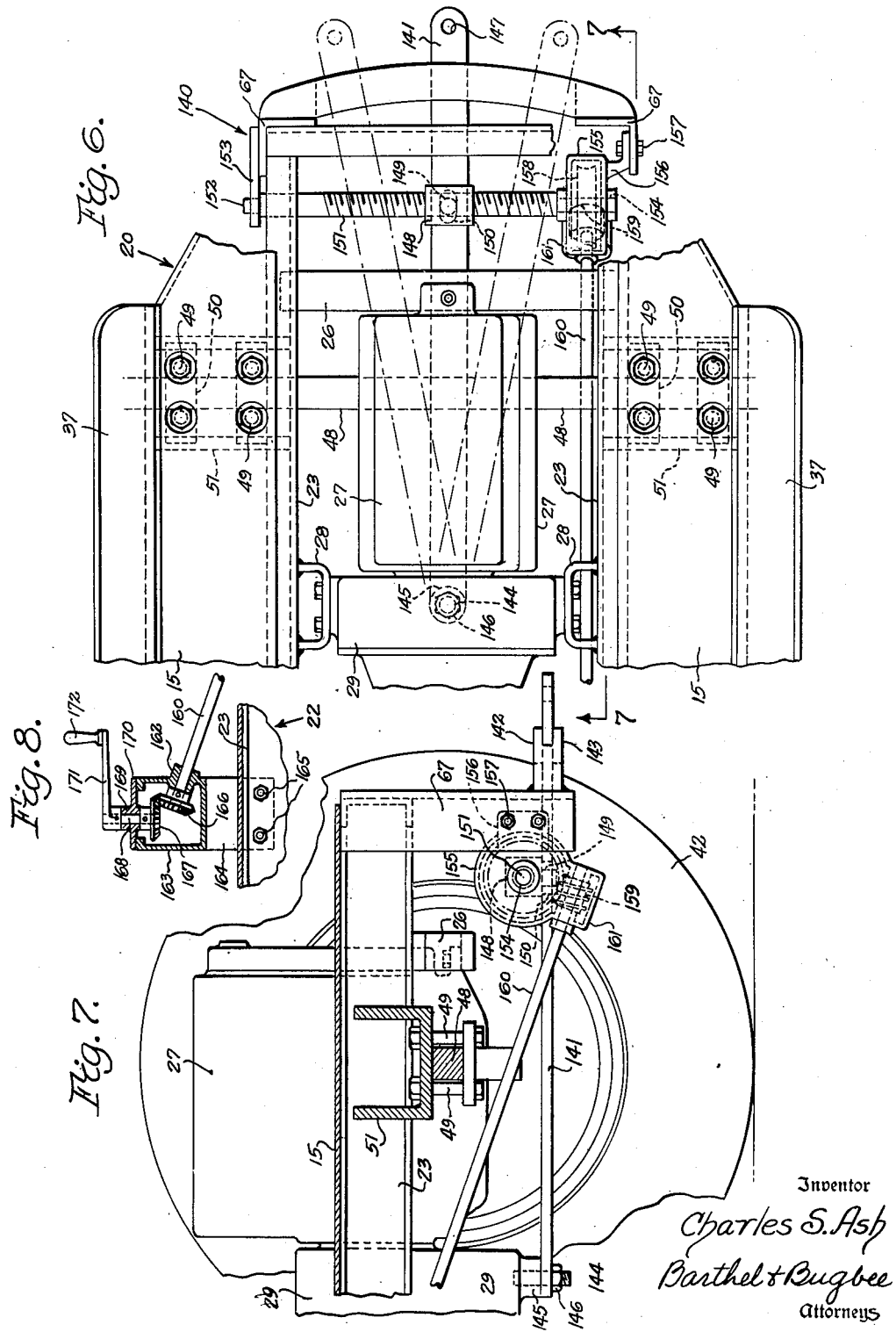

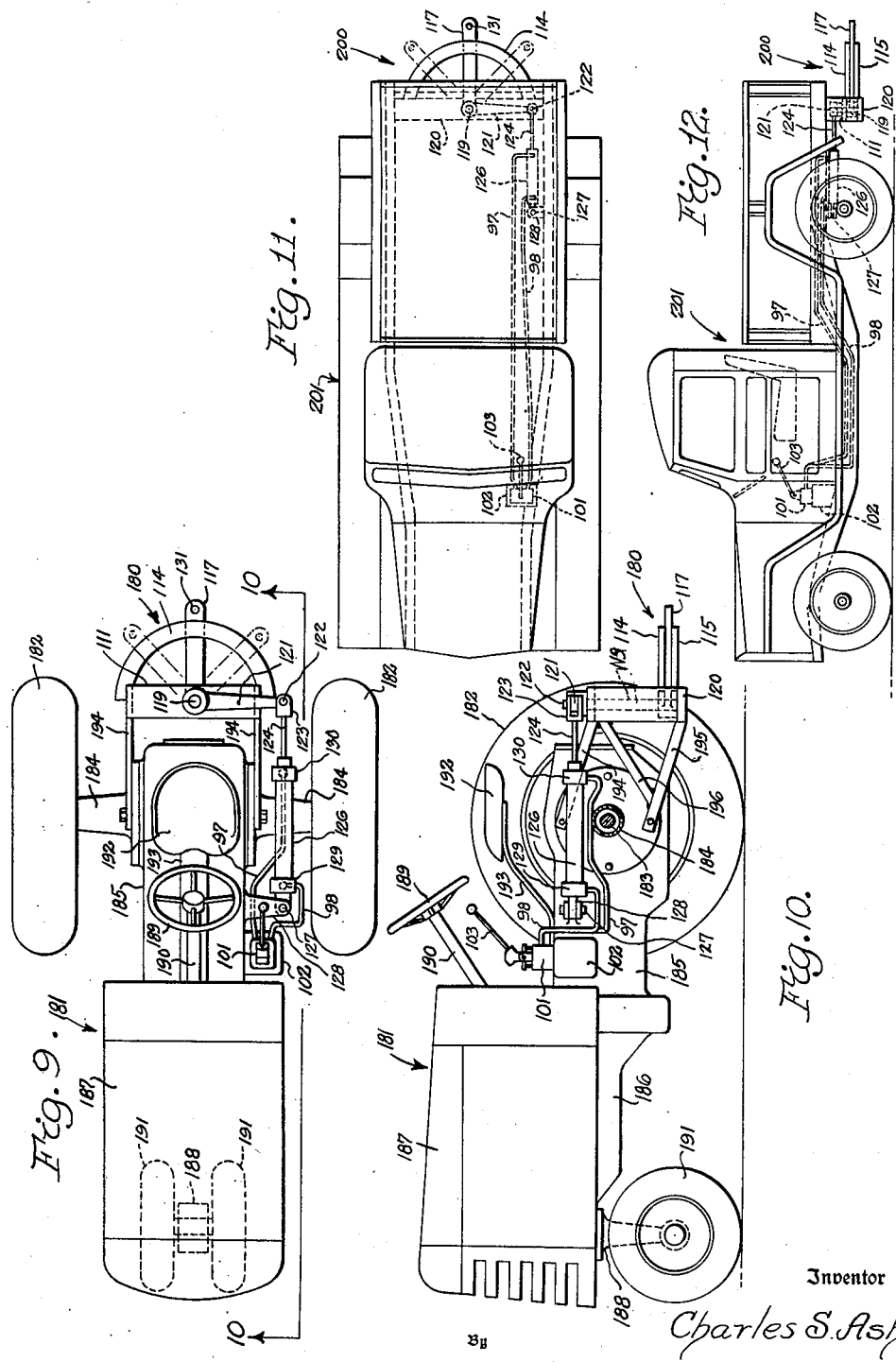

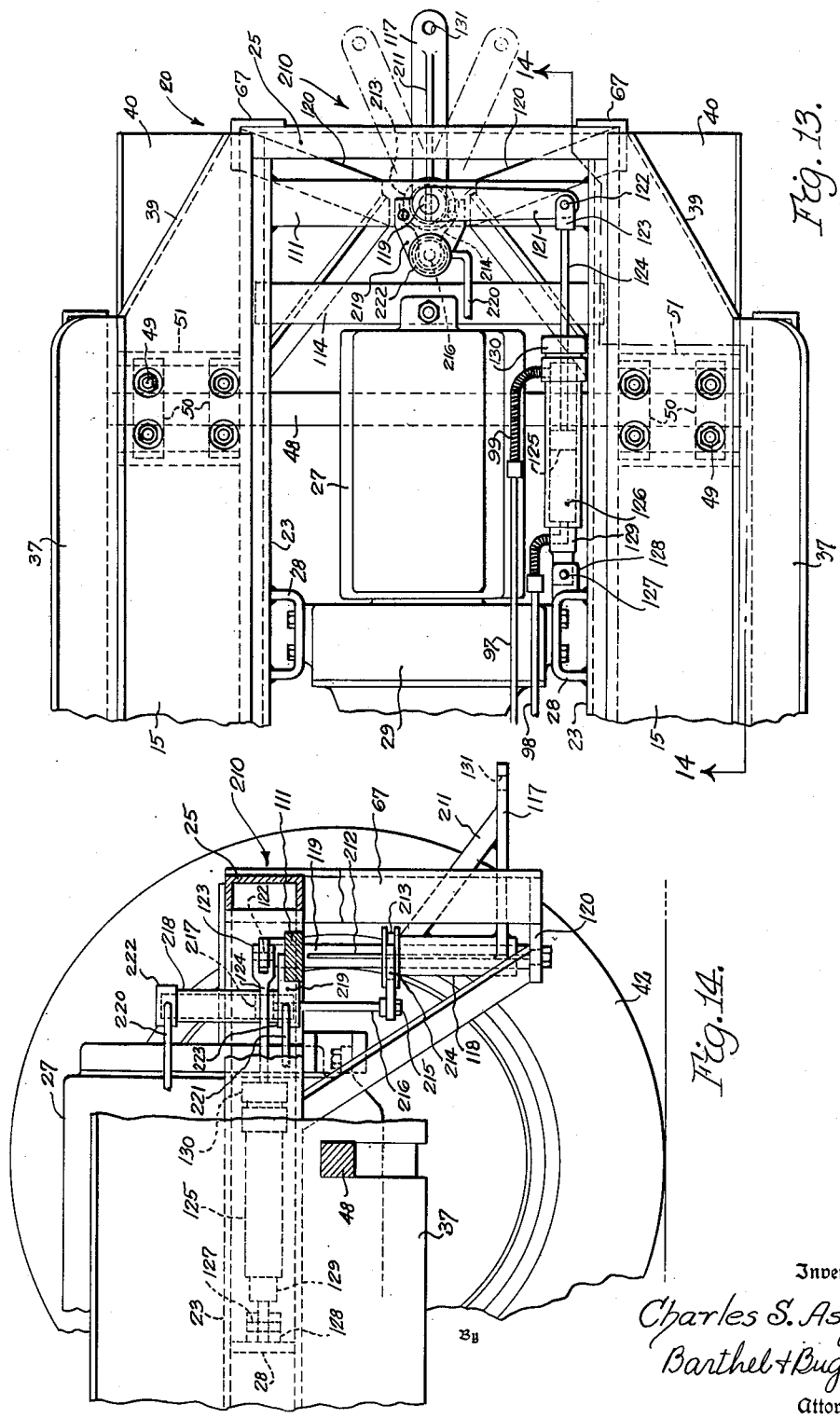

Aug. 10, 1954  C. S. ASH  2,686,063
AUXILIARY STEERING ARRANGEMENT FOR VEHICLES
Filed May 18, 1950  7 Sheets-Sheet 7

Inventor
Charles S. Ash
Barthel + Bugbee
Attorneys

Patented Aug. 10, 1954

2,686,063

UNITED STATES PATENT OFFICE 2,686,063

AUXILIARY STEERING ARRANGEMENT FOR VEHICLES

Charles S. Ash, Detroit, Mich.

Application May 18, 1950, Serial No. 162,790

6 Claims. (Cl. 280—467)

1

This invention relates to self-propelled vehicles and, in particular, to vehicles, such as tractors, intended for towing other implements or vehicles.

One object of this invention is to provide an auxiliary steering arrangement for towing vehicles, such as tractors and trucks, wherein the draw bar to which the towed vehicle is connected is forcibly shifted to one side or the other, thereby causing the load to effect the steering of the vehicle so as to force it to hold a desired course with a minimum use of the regular steering mechanism.

Another object is to provide an auxiliary steering arrangement of the foregoing character which is adapted to be used in side hill operations to prevent sliding down of either the towing or towed vehicle or implement by shifting the draw bar so as to compensate for the sliding down effect and counteract the shifting of the towed vehicle or implements resulting from the sliding down tendency.

Another object is to provide an auxiliary steering arrangement of the foregoing character which is especially adapted for use with heavy loads, using the heavy load advantageously by shifting the pulling line relatively to the towing vehicle or mobile power unit, thereby turning a liability into an asset by making the heavy load assist the normal steering apparatus rather than hinder it, as it normally does.

Another object is to provide an auxiliary steering arrangement of the foregoing character which is adapted to be used not only on four-wheel drive tractors or vehicles, but also on ordinary two-wheel drive tractors and general purpose vehicles of the type popularly known as "jeeps."

Another object is to provide an auxiliary steering arrangement of the foregoing character which reduces the wear on the normal steering apparatus and reduces the amount of power otherwise wasted in steering, as in tractors which steer by braking the wheels on one side while applying power to the wheels on the opposite side, thereby enabling the tractor to use all of its power in pulling its load without requiring it to divert power to steering operations and requiring the use of the regular steering apparatus only when turning the vehicle around, such as at the ends of the field or furrow or in making a sharp turn, the auxiliary steering arrangement being used in mainatining a desired straightaway course such as traversing a field while towing a heavy load.

Another object is to provide an auxiliary steering arrangement of the foregoing character which can either be built into the tractor or other towing vehicle as a permanent part thereof or manufactured as a separate unit to be attached to a conventional tractor or truck.

Another object is to provide an auxiliary steering arrangement of the foregoing character wherein the draw bar is adjustable vertically as well as horizontally so as to adapt it not only to steering operations but also to changes in the level at which the towed vehicle or implement is most conveniently and efficiently towed.

In the drawings:

Figure 1 is a top plan view of a tractor equipped with an auxiliary steering arrangement according to one form of the invention, with the frame partly in horizontal section;

Figure 2 is a vertical section taken along the line 2—2 in Figure 1, with one of the hydraulic operating cylinders broken away to disclose the piston thereof;

Figure 3 is a fragmentary rear elevation of the tractor shown in Figure 2;

Figure 4 is a fragmentary top plan view showing the rearward portion of a tractor equipped with a modified auxiliary steering arrangement according to the invention, but with the ground wheels omitted;

Figure 5 is a fragmentary vertical section taken along the line 5—5 in Figure 4 with one of the wheels added;

Figure 6 is a fragmentary top plan view of a second modified steering arrangement, with a portion of the frame broken away to show the screw and nut mechanism for shifting the draw bar, and also with the wheels omitted;

Figure 7 is a fragmentary vertical section taken along the line 7—7 in Figure 6;

Figure 8 is a fragmentary vertical section through the manual operating device for the auxiliary steering arrangement shown in Figure 7;

Figure 9 is a top plan view of a two-wheel drive tractor equipped with a further modification of the auxiliary steering arrangement of the invention;

Figure 10 is a side elevation of the tractor shown in Figure 9, partly in vertical section along the line 10—10 therein;

Figure 11 is a top plan view of a general purpose vehicle or truck equipped with a further modification of the auxiliary steering arrangement of the invention;

Figure 12 is a side elevation of the general purpose vehicle and steering arrangement shown in Figure 11;

Figure 13 is a fragmentary top plan view of the rearward portion of a tractor similar to that of Figure 1 but with the ground wheels omitted and equipped with a further modified auxiliary steering arrangement wherein the draw bar is reciprocable vertically as well as swingable horizontally;

Figure 15:
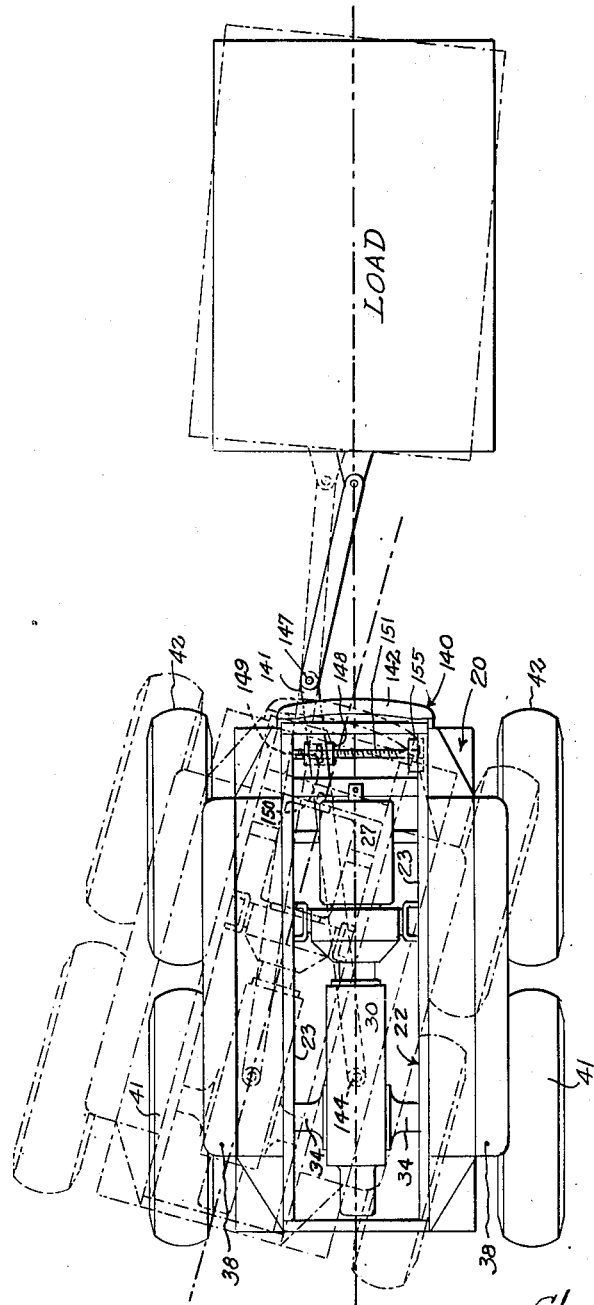

Figure 14 is a vertical section taken along the line 14—14 in Figure 13, with one of the ground wheels added; and Figure 15 is a diagrammatic top plan view of a tractor according to the form of the invention shown in Figures 1, 2 and 3, but equipped with the draw-bar shifting arrangement shown in Figures 7 and 8, illustrating the operation of the invention.

Hitherto, in tractors and other towing vehicles towing heavy loads, it has been found difficult to maintain a desired course because of the influence of the heavy load on the normal steering apparatus. This is especially true where a relatively light-weight tractor is pulling a heavy vehicle or implement across a field, or towing such an implement, like a gang plow, which sets up a heavy resistance to towing. The problem of maintaining a desired course is of increased difficulty where the tractor is being used on a side hill, in which case there is a constant tendency to slide downward to one side or to slide into the rows which are being cultivated. As a consequence, much effort is required on the part of the operator to steer the vehicle in order to compensate for such deviations from the desired course, the exertions thereby required being fatiguing to the operator where the tractor is manually steered by moving the ground wheels. On the other hand, where the tractor or other towing vehicle is of the type which is steered by braking the ground wheel or wheels on one side of the vehicle while applying power to the ground wheels on the other side thereof, a considerable amount of power of the engine is wasted in maintaining the desired course and correcting the steering deviations.

The present invention provides an auxiliary steering arrangement which alters the position of the pulling line relatively to the tractor or other towing vehicle by forcibly shifting the draw bar bodily from side to side as steering corrections are needed, thereby causing the heavy load under tow to assist the steering operations and relieve the regular steering apparatus from the necessity of correcting the course being steered. The present invention thus converts a heavy load from a liability into an asset by causing the load itself to assist in maintaining the desired course. The auxiliary steering arrangement of the present invention contemplates shifting the draw bar either hydraulically or mechanically, and provides a laterally shiftable draw bar which may be built into the tractor at the factory as an integral part thereof, or as a separate unit which can be added to existing tractors, trucks, or the like as an attachment. A further modification of the invention enables the draw bar to be raised or lowered to different levels as well as to be shifted laterally for auxiliary steering purposes. One form of the invention shifts the draw bar by means of one or more hydraulic cylinders which may also be used for operating other implements than the auxiliary steering apparatus.

Referring to the drawings in detail, Figures 1 to 3 inclusive show a four-wheel drive tractor, generally designated 20, equipped with an auxiliary steering arrangement, generally designated 21, according to one form of the invention. The tractor 20 is shown only in its broad aspects, the details thereof being described and claimed in my co-pending application, Serial No. 162,617 filed May 18, 1950, for Tractor. Briefly described, the tractor 20 includes a main frame structure, generally designated 22, including longitudinal inner frame members 23 of channel cross-section interconnected by forward and rearward cross members 24 and 25 and an intermediate cross member 26. An internal combustion engine 27 of a conventional type is mounted partly upon the cross member 26 and partly upon inwardly projecting frame extensions 28 of U-shaped form secured to the longitudinal inner frame members 23 and bolted to the clutch and flywheel housing 29 which forms an integral part of the engine 27.

Extending forwardly from the clutch and flywheel housing 29 is a transmission housing 30 containing change speed and power transmission gearing (not shown). The change speed gearing is manipulated by a conventional shift lever 31 mounted in a bell-shaped casing 32 bolted or otherwise secured to the top of the transmission housing 30. Bolted or otherwise secured to the opposite sides of the transmission housing 30 are the flanged inner end portions 33 of hollow tubular right and left front axle housings 34 having inner lugs 35 integral therewith and bolted to the frame members 23. The axle housings 34 are provided with intermediate lugs 36 which are bolted to outer approximately vertical side members 37 which are connected to the channel frame members 23 by horizontal plates or running boards 38 (Figure 3) welded or otherwise suitably secured thereto. The side members 37 at front and rear are provided with converging portions 39 to the lower portions of which are secured steps 40 by which the operator may climb aboard the vehicle. The side members 37 serve not only to strengthen the frame structure 22 but also serve to shield the operator from contact with the front and rear ground wheels 41 and 42 respectively.

The front ground wheels are rotatably mounted upon the front axle housings 34 and driven by live axles passing therethrough from the gearing within the transmission housing 30 in a manner disclosed in my previously-mentioned co-pending application, Serial No. 162,617, filed May 18, 1950, for Tractors. Sleeves 43 extending inwardly from the hubs of the wheels 41 in telescoping relationship with the outer ends of the axle housings 34 and journaled thereon, carry sprockets 44 meshing with sprocket chains 45 which in turn mesh with and drive sprockets 46 rotatably mounted on tubular driving sleeves 47. The latter in turn are journaled upon the outer ends of a fixed or dead rear axle 48, and are drivingly connected to the hubs of the rear ground wheels 42. The stationary rear axle 48 is preferably of square cross-section and is secured by bolts 49 (Figure 2) and tie plates 50 to laterally extending channel members 51 welded between the longitudinal frame members 23 and the side members 37 (Figure 1).

Mounted on the forward portion of the frame structure 22 is a box-like structure 52 (Figure 2) carrying ears 53 at its forward end supporting a pivot pin 54 upon which the forward end of a cantilever seat-supporting member 55 is pivotally mounted. A spring 56 extending between the rearward end of the seat-supporting member 55 and the structure 52 yieldably supports the pedestal or upright 57 upon which the operator's seat (not shown) is mounted.

The auxiliary steering arrangement of the present invention is generally designated 59 and is attached as follows to the lower and rearward portions of the tractor 20. Extending downward from the bottom of the transmission housing 30 are two laterally-spaced ears 60 which are bored to receive a pivot shaft 61 upon which an approximately U-shaped draw bar bracket 62 is pivotally mounted. Pivotally secured to the draw bar bracket 62, as by the pivot bolt 63 (Figures 1 and 2) is the enlarged slotted end 64 of a draw bar 65. The end 64 is provided with a slot 66 adapted to receive the draw bar bracket 62.

Secured as by welding to the rearward ends of the longitudinal frame members 23 and extending downwardly therefrom are two parallel angle members 67, the lower ends of which are interconnected by upper and lower vertically spaced arcuate guide members 68 and 69 respectively, the ends of which are spaced apart from one another by spacing blocks 70. The guide members 68 and 69 are provided with arcuate rearward edges 71 and 72 respectively centered at the axis or center of the pivot bolt 63. The draw bar 65 passes through the elongated space 73 between the upper and lower guide members 68 and 69 (Figure 3) and is drilled to receive a pin 74 which is located closely adjacent the arcuate guide edges 71 and 72 of the guide members 68 and 69 respectively. The rearward end of the draw bar 65 is drilled as at 75 to receive a coupling member by which the towed vehicle, implement or trailer is connected to the tractor 20.

In order to pull the draw bar 65 laterally to one side or the other from the solid line position to either of the dotted line positions of Figure 1, the draw bar 65 is bored as at 76 to receive an anchor bolt 77 which pivotally supports an anchor block 78 in which the rearward ends of a pair of cables 79 are securely anchored, as at 80. The cables 79 near the ends of the upper guide bars 68 pass around pulleys 81 (Figure 1) supported on axle bolts 82 secured to the angle members 67 so as to change their direction from horizontal to vertical. Immediately above the pulleys 81 near the upper ends of the angle members 67 is a second pair of pulleys 83 mounted on axle bolts 84. The vertical courses of the cables 79 pass over these upper pulleys 83 and proceed forward to terminate in clevises 85 by which the cables 79 are secured to the rearward ends of rearward piston rods 86.

The piston rods 86 reciprocate in hydraulic cylinders 87 having rearward and forward heads 88 and 89 respectively and an intermediate mounting ring 90. The mounting rings 90 are provided with threaded pivot stems 91 (Figure 1) which are pivotally mounted in bores 92 in the frame side members 23 and are retained in position by retaining nuts 93. The rearward piston rods 86 at their forward ends are connected to piston heads 94, to which are connected the rearward ends of forward piston rods 95 (Figure 2) which terminate in clevises 96. The piston heads 94 are caused to reciprocate in the cylinders 87 by pressure fluid delivered to either of the cylinder heads 88 or 89 through pipes 97 and 98 respectively having flexible connecting pipes 99 and 100 (Figure 1). The pipes 97 and 98 lead to the service ports at the opposite sides of a conventional four-way hydraulic control valve 101 mounted on top of a conventional hydraulic pump 102 which in turn is mounted on the front end of the transmission housing 30 and driven by a power takeoff shaft (not shown) from the engine 27. The suction and discharge ports of the hydraulic pump 102 are, of course, connected directly to the pressure fluid supply and fluid exhaust ports of the four-way valve 101, hence no external piping is necessary for this purpose. The four-way valve is controlled by a hand lever 103 which, when shifted, causes pressure fluid to be discharged into one of the pipes 97 and 98 and exhausted from the other of these pipes so as to move the pistons 94 simultaneously in opposite directions.

In the operation of the form of the invention shown in Figures 1 to 3 inclusive, let it be assumed that a towed vehicle or implement, such as a plow, is attached at 75 to the rearward end of the draw bar 65 and that the operator is seated upon the driver's seat. To start the tractor, the operator manipulates the gear shift lever 31 and clutch pedal (not shown) in the usual way, causing power to be transmitted from the engine 27 through the clutch, transmission and axles to the front wheels 41, and thence by the sprocket chains 45 to the rear wheels 42, as explained in detail in my above-mentioned co-pending application, Serial No. 162,617 filed May 18, 1950, for Tractor.

Let it be assumed that the operator is plowing a field, resulting in a heavy load being placed upon the draw bar 65 due to the resistance encountered by the plow. Normal steering for the purpose of turning corners or turning around is conducted by braking one of the forward wheels 41 while applying power to the other front wheel in the manner described in the said co-pending application just mentioned. To correct deviations from the desired course, however, the operator shifts the control valve lever 103 in one direction or the other to forcibly shift the draw bar 65 to the right or to the left from its normal central position shown in solid lines in Figure 1. The braking mechanism is omitted from the present disclosure in order to simplify the showing, and it is beyond the scope of the present invention.

To shift the draw bar 65 to the right into the right-hand dotted line position shown in Figure 1, the operator shifts the control valve lever 103 to cause pressure fluid to be discharged from the pump 102 through the four-way valve 101 into the pipe 97, thereby simultaneously discharging pressure fluid into the forward head 89 of the left-hand hydraulic cylinder 87 and rearward head 88 of the right-hand hydraulic cylinder 87, causing the left-hand piston 94 to be shifted to the rear and the right-hand piston 94 to be shifted toward the front of the vehicle. At the same time, fluid is simultaneously withdrawn from the forward head 89 of the right-hand cylinder 87 and the rearward head 88 of the left-hand cylinder 87 through the pipe 98 and returned to the pump 102 by way of the fourway valve 101. The motion of the pistons 94 in this manner causes the right-hand rearward piston rod 96 thereof to pull the right-hand cable 79 in a forward direction, thereby pulling the draw bar 65 to the right toward the upper dotted line position of Figure 1. This shifting of the pulling line off the central axis or center line of the tractor 20 causes the load of the pulled vehicle or implement, such as the plow, to be applied toward the right-hand rearward corner of the tractor frame 22, tending to steer the tractor 20 to the right and correcting a deviation or drift toward the left. Thus, if the tractor is pulling a gang plow which is plowing a side hill going upward to the right, the foregoing operation will steer the tractor 20 slightly uphill and thereby correct the downhill sliding tendency which is normally present in side hill plowing operations. The same manipulation will prevent the tractor from sliding leftward into rows of plants being cultivated by a cultivator connected to the draw bar 65.

To correct a deviation or drift from the desired course by using the load to steer the tractor 20 to the left, the operator shifts the control valve lever 103 in the opposite direction to admit pressure fluid to the pipe 98 and place the pipe 97 under suction. This action supplies pressure fluid simultaneously to the forward head 89 of the right-hand cylinder 87 and to the rearward head 88 of the left-hand hydraulic cylinder 87, causing the right-hand piston 94 to move rearwardly and the left-hand piston 94 to move forwardly, pulling the draw bar 65 toward the left-hand corner of the tractor frame 22, that is, toward the lower dotted line position in Figure 1. With the load thus applied to the left of the center line of the tractor near the rearward left-hand corner of the tractor frame 22, a pull is applied to the tractor 20 tending to cause it to turn toward the left. Thus, by alternately shifting the draw bar 65 to the right or to the left, the operator can instantly correct any deviation from the desired course without the need of using the regular steering gear of the tractor operated by the brake mechanism mentioned above, but not shown herein, as shown diagrammatically in Figure 15.

The modified auxiliary steering arrangement 110 shown in Figures 4 and 5 is similar in principle to the auxiliary steering arrangement 59 shown in Figures 1 to 3 inclusive and is mounted on a similar tractor 20. The modified auxiliary steering arrangement 110, however, is operated by a single hydraulic cylinder rather than the double hydraulic cylinders 7 shown in Figure 1. For this purpose, the tractor frame 22 is provided with an additional cross member 111 extending between the inner frame side members 23. Also extending between the side members 23 and a plate 112 positioned immediately below the center of the cross member 111 are downwardly and inwardly directed braces 113 forming a generally V-shaped rearwardly and downwardly extending structure. Secured to the angle members 67 near the lower ends thereof are arcuate guide members 114 and 115 with a space 116 between them for the passage of the draw bar 117. The draw bar 117 at its forward end is provided with a hub 118 which is pinned or otherwise drivingly connected to a vertical shaft 119, the upper and lower ends of which are journaled in the cross bar 111 and a V-shaped brace 120 having its outer ends secured to the lower arcuate guide member 115 (Figure 5). Intermediately, the shaft 119 passes through the plate 112 and is braced by the braces 113.

Extending laterally from the upper end of the shaft 119 and drivingly connected thereto is a crank arm 121 (Figure 4), the outer end of which is pivotally connected as at 122 to a clevis 123 mounted on the rearward end of a piston rod 124, the forward end of which is connected to a piston head 125 reciprocably mounted in a hydraulic cylinder 126, the forward end of which is pivotally mounted as at 127 upon a block 128 attached to the left-hand frame extension 28. Connected to the forward and rearward cylinder heads 129 and 130 respectively are the flexible pipes 100 and 99 leading to the pipes 98 and 97 respectively. These are connected to the pump 102 by way of the four-way valve 101 described in connection with Figures 1 to 3 inclusive.

The draw bar 117 is bored as at 131 for receiving the coupling device by which it is connected to the towed vehicle or implement, and swings to and from within the upper and lower arcuate guide members 114 and 115, the rearward edges 132 and 133 of which are centered at the axis of the shaft 119.

The operation of the modified auxiliary steering arrangement 110 of Figures 4 and 5 is generally similar to the operation of the auxiliary steering arrangement 59 of Figures 1 to 3 inclusive. To shift the draw bar 117 forcibly to the right, pressure fluid is admitted through the pipes 98 and 100 to the forward end of the hydraulic cylinder 126, pushing the piston 125 and piston rod 124 thereof rearwardly so as to swing the crank arm 121 in a counterclockwise direction. This shifts the draw bar 117 toward the right-hand rearward corner of the tractor frame 22 and counteracts a deviation or drift of the tractor 20 to the left by applying a steering effort to the right.

The modified auxiliary steering arrangement, generally designated 140, shown in Figures 6 to 8 inclusive is similar as regards the draw bar 141 and its upper and lower arcuate guides 142 and 143 to the corresponding parts of the auxiliary steering arrangement 59 shown in Figure 1, except that the forward end of the draw bar 141 is pivotally mounted upon a stud 144 which is threaded into a boss 145 on the bottom of the clutch and flywheel housing 29 (Figure 7). A retaining nut 146 holds the draw bar 141 in position. The rearward end of the draw bar 141 passes through the space between the upper and lower arcuate guide members 142 and 143 and is drilled as at 147 to receive the coupling device by which the towed vehicle or implement is attached thereto.

In order to forcibly shift the draw bar 141 to and fro into the dotted line positions, an internally threaded nut 148 is provided with a downwardly extending stem 149 pivotally mounted in an elongated slot 150 in the draw bar 141. Threaded through the nut 148 is a correspondingly threaded screw shaft 151 (Figure 6), one end 152 of which is rotatably mounted in a bracket 153 secured to the right-hand vertical angle member 67. The opposite end of the screw shaft 151 is journaled as at 154 in a worm reduction gear housing 155 which in turn is mounted on a bracket 156 which is bolted as at 157 to the left-hand vertical angle member 67. Mounted on the left-hand end of the screw shaft 151 is a worm wheel 158 and meshing with the worm wheel 158 is a worm 159 mounted on the end of an upwardly inclined shaft 160 (Figure 7). The lower end of the shaft 160 is journaled in a housing extension 161 which houses the worm 159, whereas the upper end of the shaft 160 is journaled in a boss 162 (Figure 8) in a side wall of a bevel gear housing 163. The latter is mounted on a bracket 164 which is bolted as at 165 to one of the longitudinal frame members 22. Pinned or otherwise drivingly secured to the upper end of the shaft 160 is a bevel gear 166 which meshes with a bevel gear 167 pinned or otherwise drivingly secured to a crank shaft 168. The latter is rotatably mounted in a boss 169 in the cover plate 170 of the bevel gear housing 163. A hand crank 171 with a handle 172 is pinned or otherwise drivingly secured to the crank shaft 168.

In the operation of the modified steering arrangement shown in Figures 6 to 8 inclusive, as shown diagrammatically in Figure 15 the forcible shifting of the draw bar 141 affects the steering of the tractor 20 in the same manner as has been heretofore described. The draw bar is shifted to and fro from the center line of the tractor 20 by rotating the hand crank 171 and consequently the shafts 168, 169 and 151 in order to move the nut 148 to and fro along the screw shaft 151. The connection 149, 150 between the nut 148 and the draw bar 141 forces the draw bar 141 to follow the travel of the nut 148. Thus, the draw bar 141 is shifted mechanically rather than hydraulically as in the previous forms of the invention.

The modified auxiliary steering arrangement, generally designated 180, shown in Figures 9 and 10 is an application of the auxiliary steering arrangement to a conventional tractor, generally designated 181, having rear ground wheels 182 which are driven from axles 183 mounted in housings 184 bolted to the transmission housing 185. The tractor 181 is provided with an engine 186 beneath a hood 187 in the forward part of the vehicle, and a front wheel support 188 is pivotally mounted at the forward end of the tractor 181 and rotated by a steering wheel 189 in a steering post 190 in order to turn the front wheels 191 to normally steer the vehicle. A seat 192 is mounted upon a cantilever bar 193, the lower end of which is secured to the transmission housing 185.

The auxiliary steering arrangement 180 is almost identical with the auxiliary steering arrangement 110 shown in Figures 4 and 5 and similar parts are similarly designated. The upper cross member 111 is supported on upper braces 194 bolted to the transmission housing 185, whereas the lower cross member 120 is connected by braces 195 to the transmission housing 185, additional braces 196 extending upward therefrom to the upper cross bar 111. The draw bar 117 is, as before, swingable to and fro between upper and lower arcuate guide members 114 and 115 by means of a vertical shaft 119 carrying a crank 121 which is shifted to and fro by the piston rod 124 of the hydraulic cylinder 126 in response to the manipulation of the control lever 103 of the four-way valve 101 regulating the distribution of pressure fluid from the pump 102. The latter is driven from the engine of the tractor 181 through any suitable mechanism.

The operation of the auxiliary steering arrangement 180 of the tractor 181 is substantially identical with that described in connection with the auxiliary steering arrangement 110 of Figures 4 and 5 and requires no repetition.

The modified steering arrangement, generally designated 200, shown in Figures 11 and 12 is applied to a truck or general purpose vehicle, generally designated 201, of the type popularly known as a "jeep." The construction and operation of the auxiliary steering arrangement 200 is substantially similar to those of the auxiliary steering arrangement 180 and accordingly no additional description is necessary.

The modified auxiliary steering arrangement 210 shown in Figures 13 and 14 is also generally similar in construction to the auxiliary steering arrangement 110 of Figures 4 and 5 and similar parts are similarly designated. In Figures 13 and 14, however, the draw bar 117 is not fixedly mounted upon the vertical shaft 119, but is movable vertically up and down it in order to give a vertical adjustment to the draw bar 117. For this purpose, the draw bar 117 is provided with an elongated hub 118 which is connected by an additional brace 211 to the draw bar 117 (Figure 14) and which is drivingly connected as by the spline 212 to the shaft 119. The upper end of the hub 118 is provided with a shift collar 213 engaged by a shift yoke 214 which is bolted as at 215 to the lower end of a piston rod 216. The piston rod 216 at its upper end is connected to a piston 217 which is reciprocable in a vertical hydraulic cylinder 218, the lower end of which is mounted on a bracket 219 bolted or otherwise suitably secured to the cross member 111. Pipes 220 and 221 lead respectively to the upper and lower heads 222 and 223 of the hydraulic cylinder 218, the lower head 223 forming a part of the bracket 219. The remaining parts are similar to those shown in Figures 4 and 5 and are similarly numbered.

The operation of the modified auxiliary steering arrangement 210 attached to the tractor 20 is generally similar to that of the steering arrangement 110 shown in Figures 4 and 5 and hence requires no repetition. The draw bar 117 is shifted to and fro by admitting pressure fluid to the forward or rearward end of the horizontal hydraulic cylinder 126 to swing the crank arm 121 and consequently swing the draw bar 117 laterally into either of the dotted line positions shown in Figure 13. To raise the draw bar 117, however, the operator admits pressure fluid to the pipe 221, which pressure fluid, acting under the piston 217, forces the piston 217 upward, carrying with it the piston rod 216 and shift yoke 214. The upward motion of the shift yoke 214 by its engagement with the shift collar 215 likewise moves the hub 118 of the draw bar 117 upward along the shaft 119, thereby applying a vertical adjustment to the draw bar 117. The spline or key 212 between the hub 118 and shaft 119, however, maintains a driving connection therebetween, even though the hub 118 and consequently the draw bar 117 is raised or lowered.

In all of the foregoing forms of the invention, it is of course necessary to the operation of the auxiliary steering arrangement that a load of some kind be connected to the draw bar. In the absence of such a load, such as when the towing vehicle is operating alone, the main or normal steering gear is employed to steer the vehicle, namely by braking the wheels on one side of the vehicle and applying power to the wheels on the other side, as previously explained herein. It will also be evident that in place of the wheels 41 and 42, a caterpillar or endless belt type of tread may be employed, as the principles of the invention apply equally well to such a tread. The load which is pulled by the towing vehicle may be of various types, such as vehicles, agricultural or earth-moving implements, sledges, stone boats, drags, road-making and road-repairing machinery, military equipment including ordnance. The device may be used in connection with travel over snow or ice-covered surfaces, towing any of the above loads.

The action of the load and the auxiliary steering arrangement of the present invention upon one another is somewhat analogous to the action of a ship being steered by its rudder. In a twin-screw ship operating in a body of water without current or wind, the rudder merely alters the course of the ship when it is placed at an angle to the center line of the ship. In single screw ships, however, the screw propeller itself exerts a torque and lateral effect tending to steer the ship slightly off course, and this is counteracted by the rudder. Currents, tide and winds also create effects which are counteracted by the use of the rudder. In the present invention, the load which is under tow also serves to effect alteration of the course of the vehicle when the draw bar is forcibly shifted to one side or the other of the center line of the vehicle, as explained above, and as shown diagrammatically in Figure 15.

Figure 15 shows how the four-wheel drive tractor 20 is steered by shifting the load application point 147 on the draw bar 141 relatively to the guide 142 while maintaining the drive on all four wheels 41, 42. In this manner, full traction is maintained while steering is being accomplished, in contrast to the traction being obtained on only two wheels when steering is being accomplished by braking the other two wheels. Two-wheel traction drive frequently creates difficulty in steering because of lack of traction, particularly on ground where ordinary traction is diminished by other factors, such as mud, sand or a slanting terrain.

The action of the load applied to the shifted load-application point 147, as shown in Figure 15, creates a partial skidding effect, as shown in the dotted line position of the tractor, causing the tractor to execute a turn. If the draw bar 149 is not shifted back to its central position, the tractor executes a turn in a complete circle. In the machine as actually constructed, a stone boat used as the load and weighted down with stones, causes the displacement of the tractor 20 as shown in the dotted lines of Figure 15, and the turning action occurs as stated above. While the turn is being executed, the draw bar 141 is, of course, forcibly held in its displaced position by the screw 151 and nut 148 or other means of displacing the draw bar shown in the other forms of the invention, as a freely swinging draw bar which is not so forcibly held will not create the above-described steering effect. Experience with the machine as actually constructed has shown that the tractor drawing a stone boat loaded with rocks by forcibly shifting the draw bar 141 accomplishes steering in a very easy manner with a very small expenditure of power while still maintaining traction on all four wheels. By using the normal steering arrangement of braking two wheels with power applied only to the other two wheels and without the aid of the shifted draw bar 141, it has been found that a much greater amount of power is required in steering the tractor, and in muddy ground or on steep side hills, such steering becomes very difficult and uncertain in comparison with steering by the cooperative use of the load and the shifted draw bar, as described above.

What I claim is:

1. An auxiliary steering arrangement for a towing vehicle comprising a pivot element pivotally mounted on said towing vehicle on a vertical axis, a draft member reciprocably mounted on said pivot element for axial motion therealong and extending rearwardly therefrom, said draft member being drivingly connected to said pivot element, a draft member swinging device operatively connected to said draft member and effective to move the rearward end of said draft member laterally to and fro, force-applying mechanism operatively connected to said swinging device, and a motive instrumentality reciprocably connected to said draft member for moving said draft member axially along said pivot element.

2. An auxiliary steering arrangement for a towing vehicle comprising a pivot element pivotally mounted on said towing vehicle on a vertical axis, a draft member reciprocably mounted on said pivot element for axial motion therealong and extending rearwardly therefrom, said draft member being drivingly connected to said pivot element, a draft member swinging device operatively connected to said draft member and effective to move the rearward end of said draft member laterally to and fro, force-applying mechanism operatively connected to said swinging device, and a fluid pressure motor reciprocably connected to said draft member for moving said draft member axially along said pivot element.

3. An auxiliary steering arrangement for a towing vehicle comprising a pivot element pivotally mounted on said towing vehicle on a vertical axis, a draft member reciprocably mounted on said pivot element for axial motion therealong and extending rearwardly therefrom, said draft member being drivingly connected to said pivot element, a draft member swinging device operatively connected to said draft member and effective to move the rearward end of said draft member laterally to and fro, force-applying mechanism including a first fluid pressure motor operatively connected to said swinging device, and a second fluid pressure motor reciprocably connected to said draft member for moving said draft member axially along said pivot element.

4. An auxiliary steering arrangement for a towing vehicle comprising a vertical pivot shaft pivotally mounted on said towing vehicle on a vertical axis, a draft member reciprocably mounted on said pivot shaft for axial motion therealong and extending rearwardly therefrom, said draft member being drivingly connected to said pivot shaft, a draft member swinging device including a lever operatively connected to said pivot shaft and effective to move the rearward end of said draft member laterally to and fro, force-applying mechanism operatively connected to said lever, and a motive instrumentality reciprocably connected to said draft member for moving said draft member axially along said pivot shaft.

5. An auxiliary steering arrangement for a towing vehicle comprising a vertical pivot shaft pivotally mounted on said towing vehicle on a vertical axis, a draft member reciprocably mounted on said pivot shaft for axial motion therealong and extending rearwardly therefrom, said draft member being drivingly connected to said pivot shaft, a draft member swinging device including a lever operatively connected to said pivot shaft and effective to move the rearward end of said draft member laterally to and fro, force-applying mechanism including a fluid pressure motor operatively connected to said lever, and a motive instrumentality reciprocably connected to said draft member for moving said draft member axially along said pivot shaft.

6. An auxiliary steering arrangement for a towing vehicle comprising a pivot element pivotally mounted on said towing vehicle on a vertical axis, a draft member movably mounted on said pivot element for up-and-down motion relatively thereto, said draft member being connected to said pivot element and extending rearwardly therefrom, a draft member swinging device operatively connected to said draft member and effective to move the rearward end of said draft member laterally to and fro, motive mechanism operatively connected to said swinging device, and a motive instrumentality operably connected to said draft member and effective to move said draft member upward and downward relatively to said pivot element.

References Cited in the file of this patent

UNITED STATES PATENTS

| Number | Name | Date |
|---|---|---|
| 404,472 | Dunn | June 4, 1889 |
| 1,391,963 | Miller | Sept. 27, 1921 |
| 1,542,093 | Raymond | June 16, 1925 |
| 1,612,896 | Wenner | Jan. 4, 1927 |
| 1,842,129 | Thomas | Jan. 19, 1932 |
| 1,962,423 | Brown | June 12, 1934 |
| 2,309,087 | Arndt | Jan. 26, 1943 |
| 2,368,202 | Clark | Jan. 30, 1945 |
| 2,375,970 | Williams | May 15, 1945 |

FOREIGN PATENTS

| Number | Country | Date |
|---|---|---|
| 574,747 | Great Britain | Jan. 18, 1946 |
| 619,744 | Great Britain | Mar. 14, 1949 |